US010938798B2

(12) United States Patent
Townend (10) Patent No.: US 10,938,798 B2
(45) Date of Patent: Mar. 2, 2021

(54) CONFIGURATION OF WIRELESS-EQUIPPED DEVICES

(71) Applicant: BRITISH TELECOMMUNICATIONS PUBLIC LIMITED COMPANY, London (GB)

(72) Inventor: David Townend, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 16/465,350

(22) PCT Filed: Nov. 13, 2017

(86) PCT No.: PCT/EP2017/079054
§ 371 (c)(1),
(2) Date: May 30, 2019

(87) PCT Pub. No.: WO2018/104006
PCT Pub. Date: Jun. 14, 2018

(65) Prior Publication Data
US 2019/0394643 A1    Dec. 26, 2019

(30) Foreign Application Priority Data
Dec. 8, 2016    (EP) .................................... 16203021

(51) Int. Cl.
*H04L 29/06*    (2006.01)
*H04W 4/50*    (2018.01)
(Continued)

(52) U.S. Cl.
CPC .............. *H04L 63/08* (2013.01); *H04W 4/50* (2018.02); *H04W 12/0401* (2019.01);
(Continued)

(58) Field of Classification Search
CPC ................................ H04L 63/08; H04L 63/10
See application file for complete search history.

(56) References Cited

U.S. PATENT DOCUMENTS

2004/0264395 A1    12/2004  Rao
2008/0070577 A1*   3/2008   Narayanan ............ H04L 63/062
                                                                455/436
(Continued)

FOREIGN PATENT DOCUMENTS

CN    1578319 A    2/2005
CN    1578319 A    2/2005
(Continued)

OTHER PUBLICATIONS

International Search Report for PCT/EP2017/079054, dated Dec. 8, 2017, 4 pages.
(Continued)

*Primary Examiner* — Jason K Gee
(74) *Attorney, Agent, or Firm* — Nixon & Vanderhye P.C.

(57) ABSTRACT

In order to allow automatic installation of a newly-supplied wireless device (2) such that it can communicate with the internet (9) through an access point (7), the new device (2) is configured so that on initial installation it operates in access point mode. A remote service provider (4) is provided with authentication information (406) and generates to instructions to the access point (7) to monitor for a broadcast beacon from the target wireless device (2). When it detects the beacon, the access point (7) switches to client mode to establish a secured wireless network connection (8) between the access point (7) and the new wireless network device (2), with the access point (7) operating in a client mode. By reversing the roles in this way, the provider of the new device (2) can arrange for automatic connection to the access point (7) without having to programmed the device (2) with any password or other data relating to the custom- (Continued)

er's access network. The customer's network is instead provided with security data burnt in to the new device on manufacture. The new device (2) can then exchange data with the access point (7) relating to a local area network controlled by the access point (7), such that it can be added to that LAN as a client, with the access point (7), with its connection to the Internet (9) then reverting to normal access point mode. Alternatively the new device (2) may be configured to remain in access point mode to operate as a repeater or, if it is connected to the internet (9) itself, to replace the original access point (7).

16 Claims, 4 Drawing Sheets (51) Int. Cl.
| | |
|---|---|
| *H04W 76/10* | (2018.01) |
| *H04W 12/04* | (2021.01) |
| *H04W 12/06* | (2021.01) |
| *H04W 48/20* | (2009.01) |
| *H04W 12/08* | (2021.01) |

(52) U.S. Cl.
CPC ....... *H04W 12/0407* (2019.01); *H04W 12/06* (2013.01); *H04W 12/08* (2013.01); *H04W 48/20* (2013.01); *H04W 76/10* (2018.02)

(56) References Cited

U.S. PATENT DOCUMENTS

| | | |
|---|---|---|
| 2013/0217359 A1 | 8/2013 | Cherian et al. |
| 2014/0250513 A1 | 9/2014 | Cao et al. |
| 2015/0128230 A1 | 5/2015 | Chang et al. |
| 2015/0373538 A1* | 12/2015 | Huang .................. H04N 7/181 726/5 |

FOREIGN PATENT DOCUMENTS

| | | |
|---|---|---|
| CN | 103828413 A | 5/2014 |
| CN | 103828413 A | 5/2014 |
| CN | 105706416 A | 6/2016 |
| CN | 105706416 A | 6/2016 |
| CN | 110050454 A | 7/2019 |
| WO | 2015/071395 | 5/2015 |

OTHER PUBLICATIONS

Written Opinion of the ISA for PCT/EP2017/079054, dated Dec. 8, 2017, 5 pages.
Search Report for GB1620900.9, dated Apr. 25, 2017, 2 pages.
International Preliminary Report on Patentability for PCT/EP2017/079054, dated Apr. 3, 2019, 9 pages.
Chinese Search Report dated Nov. 26, 2019 issued in Chinese Application No. 2017800759038 (2 pgs.) and translation (2 pgs.).

* cited by examiner

CONFIGURATION OF WIRELESS-EQUIPPED DEVICES

This application is the U.S. national phase of International Application No. PCT/EP2017/079054 filed 13 Nov. 2017, which designated the U.S. and claims priority to EP Patent Application No. 16203021.7 filed 8 Dec. 2016, the entire contents of each of which are hereby incorporated by reference.

BACKGROUND AND SUMMARY

This invention relates to configuration of wireless-equipped devices, and in particular to prepare such devices for connection of customer premises equipment such as a wireless access point with a Wi-Fi peripheral client device newly-supplied to a user.

The procedures for establishing connection of a new client device to the Wi-Fi network are prescribed by the IEEE (in the Wi-Fi 802.11 standards) and the WFA (Wi-Fi Alliance), which prescribe certifications and future standards direction.

In a Wi-Fi network the access point (also known as a router) manages the network admission process, and masters network security credentials. Any Wi-Fi-capable client device may connect to it in order to gain network or internet connectivity using these security credentials.

The most common methods for establishing a Wi-Fi connection include 'Pre-shared Key' (PSK) and 'Push Button' (typically known as WPS push button configuration).

In a Pre-shared Key system, the user interacts with the client device typically through a graphical user interface and selects a Wi-Fi network identifier (SSID) from a list, populated by the client through scanning the surrounding environment. Having selected the desired Wi-Fi network, the user then has to input a password/passcode to connect the new device to the Wi-Fi network. In a push-button system the user can push a physical (or software button) on both the access-point and client device within a short time frame in order to exchange security credentials and establish connectivity.

United States Patent application US2015/0128230 describes a process for establishing a client/server connection automatically if the client device has previously had suitable credential details loaded onto it.

In all these cases, the client device may learn of the access point's presence by listening for beacon frames that are broadcast at regular intervals from the access point. In these beacon frames the network name and security modes are detailed.

These systems, although simplified as much as possible and very familiar to users of modern Wi-Fi devices, require some interaction from the user either at the point of sale or manufacture, or when first connected to the user's private network, in order to get the client device connected. This invention aims to remove all user interaction in the connection procedure completely, by arranging for a product to seamlessly connect to the correct Wi-Fi network with no intervention by the customer—a 'zero-touch' setup experience. Existing solutions involve either some level of user interaction or are inherently insecure. In particular, it is undesirable that the security data of the user's access point be programmed into a new device either on the production line or in the warehouse (unpacking the new device, powering it up and importing these parameters), as this compromises the security of the customer's Local Area Network (LAN), and is also logistically complex and costly because there is an element of customisation for each new device prior to shipping. It would be necessary to ensure the security details for that customer's home network were only ever programmed on to the device that is destined for them, and to ensure that the device is delivered to the correct person securely, as interception of the device, for example in the mail or because of misdelivery, would give access to the user's LAN credentials It is therefore desirable that such connection be made without compromising the security of the access point by revealing the network name and security modes to another party such as the manufacturer, supplier, service provider or delivery organisation supplying the device to the user. It is also desirable that a new device does not require configuration specific to the user, so that any specimen of the required product can be dispatched without modification, so that the device's own security codes can be "burnt in" at manufacture and not be vulnerable to unauthorised alteration. It is thus desirable that the access point be given information by which to recognise the new device, rather than the converse.

United States Patent application US2015/373538 describes a process in which an access point changes operating mode to become a client node in order to connect to a client device and exchange security credentials. The access point reconfigures itself to client mode on receipt of instructions from the service provider's server. It would be inconvenient to initiate this reconfiguration without prompting from the user, as the access point cannot be used for its normal purposes whilst in the client mode, so it would be necessary for the user to initiate the process by transmitting an identifier for the new device when he is ready to connect the device with the access point. This requires an action to be performed by the user when connection is to be made. The present invention allows automation of these steps, so that the process is initiated automatically by the presence of the new device.

According to the present invention, there is provided a wireless network device providing:
- a wireless interface;
- a remote management function to receive, from a remote service provider, authentication information for establishing a secured wireless network connection to a target wireless device initially operating in an access point (AP) mode,
- a configuration function to configure the wireless network device to operate as a client device in a wireless network through the wireless interface;
- an automatic connection function to connect the wireless network device as a client to the target wireless device based on the authentication information;
- a configuration function to generate an access key for transmission to the target wireless device that allows establishment of a secured wireless network connection controlled by the wireless network device;
- characterised in the provision of a recognition function responsive to receipt of the authentication information from the remote service provider by entering a listening mode in which, during operation in an access point mode, it monitors for an identifying beacon broadcast from the target wireless device, and to activate the configuration function to switch into a client mode on detection of the identifying beacon.

Preferably, the configuration function is arranged to:
transmit client authentication data to the target wireless device;

cause the target wireless device to switch into a client mode, in which the target wireless device is to connect as a client, with the wireless network device using the access key;

return the wireless network device to the access point mode; and establish a secured wireless network connection over the wireless interface, with the target wireless device operating in client mode.

The configuration function may transmit, to the target wireless device, data relating to the configuration settings of the wireless network device as an access point, such that the target wireless device may be configured to operate in access point mode using the access key and the same configuration details as the wireless network device.

The invention also provides a wireless device configured to operate as a target wireless device for co-operation with the wireless network device, providing:

a wireless interface a configuration management system capable of configuring the target wireless device in an access point mode and in a client mode;

an automatic connection function responsive to authentication data received from a wireless network device initially operating in an access point mode, to establish a secured wireless network connection over the wireless interface, between the target wireless device operating in access point mode and a client mode of the wireless network device, a configuration function responsive to an access key received from the wireless network device to reconfigure the target wireless device to operate in a client mode in a secured wireless network connection controlled by the wireless network device;

characterised in that the configuration management system is initially configured to operate in a default access point mode in which a broadcast beacon is transmitted by the wireless interface for detection by a wireless network device.

The configuration management function may be responsive to access key data from the wireless network device, to receive access point configuration data from the wireless network device, and to operate in access point mode, using the same access identity as the wireless network device.

The wireless device may be configured to operate in access point mode and to generate the broadcast beacon on first power up, until the first to occur of detection of the access key initiation of a manual over-ride procedure expiry of a time-out period.

The configuration management function may be made responsive to an access key received from the wireless network device, by switching to a client mode for co-operation with an access point mode of the wireless network device.

The invention also provides a method of operating a wireless network device in co-operation with a target wireless device, by transmitting, from a remote service provider, authentication information for establishing a secured wireless network connection between the wireless network device and the target wireless network device, operating the wireless network device in a client mode and the target wireless device in an access point mode, transmitting an access key from the wireless network device to the target wireless network device, the access key providing data for establishing a secured wireless network connection with the wireless network device as access point;

characterised in that, in response to receiving the authentication information from the remote service provider, the target wireless device switches to an access point mode and transmits a broadcast beacon, in response to receiving the authentication information from the remote service provider, the wireless network device enters a listening mode in which, whilst operating in an access point mode, it monitors for a broadcast beacon from the target wireless device, on detection of the beacon from the target wireless device, the wireless network device switches into the client mode for connection to the target wireless device for transmission of the access key.

In response to transmission of the access key, the wireless network device may switch back into access point mode, in response to reception of the access key, the target wireless device switches into a client mode, and connects as a client with the wireless network device, using client authentication data transmitted by the wireless network device to the target wireless device;

and a secured wireless network connection is established between the wireless access point operating in access point mode and the target wireless device operating in client mode.

The access key transmitted by the wireless network device to the target wireless device may include client authentication data, and in response to reception of the access key, the target wireless device is reconfigured to operate in access point mode using the access key and the same access identity as the wireless network device.

The target wireless device may operate in access point mode, generating broadcast beacons on first power up, until the first to occur of detection of the access key initiation of a manual over-ride procedure expiry of a time-out period The invention also provides a remote management server for controlling the operation of a wireless access point, comprising a data store for receiving and storing data recording a concordance between authentication information relating to each of one or more a target wireless devices and a corresponding respective public identity relating to the or each target wireless device an enquiry function for receiving data matching the public identity of a target wireless device to a specified wireless access point a retrieval function for retrieving, from the store, the authentication information corresponding to the public identity of the target wireless device and for transmitting the authentication information to the specified wireless access point, together with configuration instructions characterised in that the configuration instructions are set to cause the specified wireless access point to:

enter a listening mode in which, whilst operating in an access point mode, it monitors for a broadcast beacon from the target wireless device and, on detection of the broadcast beacon, to switch into a client mode for connection to the target wireless device.

The invention also provides a process for remote configuration of a programmable wireless-enabled device to operate according to the wireless access point defined above by transmission of programme data to the wireless-enabled device over a data communications connection.

The invention also provides a computer system, including a processor and a memory storing computer program code, for performing the method of the invention, and a computer program element comprising computer program code to, when loaded into a computer system and executed thereon, cause the computer to perform the method.

The present invention enables a function to be built into the access point to allow a 'set and forget' scenario. The function allows the access point to initiate a listening mode, which allows the access point to wait for a specific device to appear in range before it takes further action. The listening mode can be initiated by instructions transmitted from a remote location, for example a location from which the device is to be dispatched to the user, to allow the access point to be made ready for the subsequent arrival of the device at the user's premises.

In an embodiment, a remote management system informs the access point of a new device with which it is to connect, typically over the Internet, when the device is dispatched from the warehouse, but only takes action when the new device is detected by the access point during normal operation.

This allows automatic configuration of newly purchased devices, with no interaction by the end user, allowing wireless connection of a new product to the customer's Wi-Fi network to take place automatically, without the user inputting Wi-Fi passwords etc. Another use may be for automatic updating of the customer-specific configuration of a new or replacement broadband access point, to allow automatic transfer of customer specific passwords and settings from the customer's existing access point to the new one.

This arrangement allows a non-customised generic device to be sent to a customer, and temporary credentials be given to the customer's existing access point equipment to allow installation (online and working) automatically without any additional action, as soon as it is within range of the user's access point. There is assurance that the credentials have been sent to the correct access point equipment because they are sent to that customer's network connection. This way the procedure is secure, as the supplier or service provider does not need to know the user's network credentials, and devices that are to be shipped do not need personalisation in any way.

BRIEF DESCRIPTION OF THE DRAWINGS

Embodiments of the invention will now be described, by way of example, with reference to the drawings, in which.

DETAILED DESCRIPTION OF PRESENT EXAMPLE EMBODIMENTS

The first embodiment relates to a process for connecting a new peripheral device to an existing access point. The second embodiment relates to a process for installing a new access point to replace the existing access point. Most of the steps are common to both processes.

Figure 1:
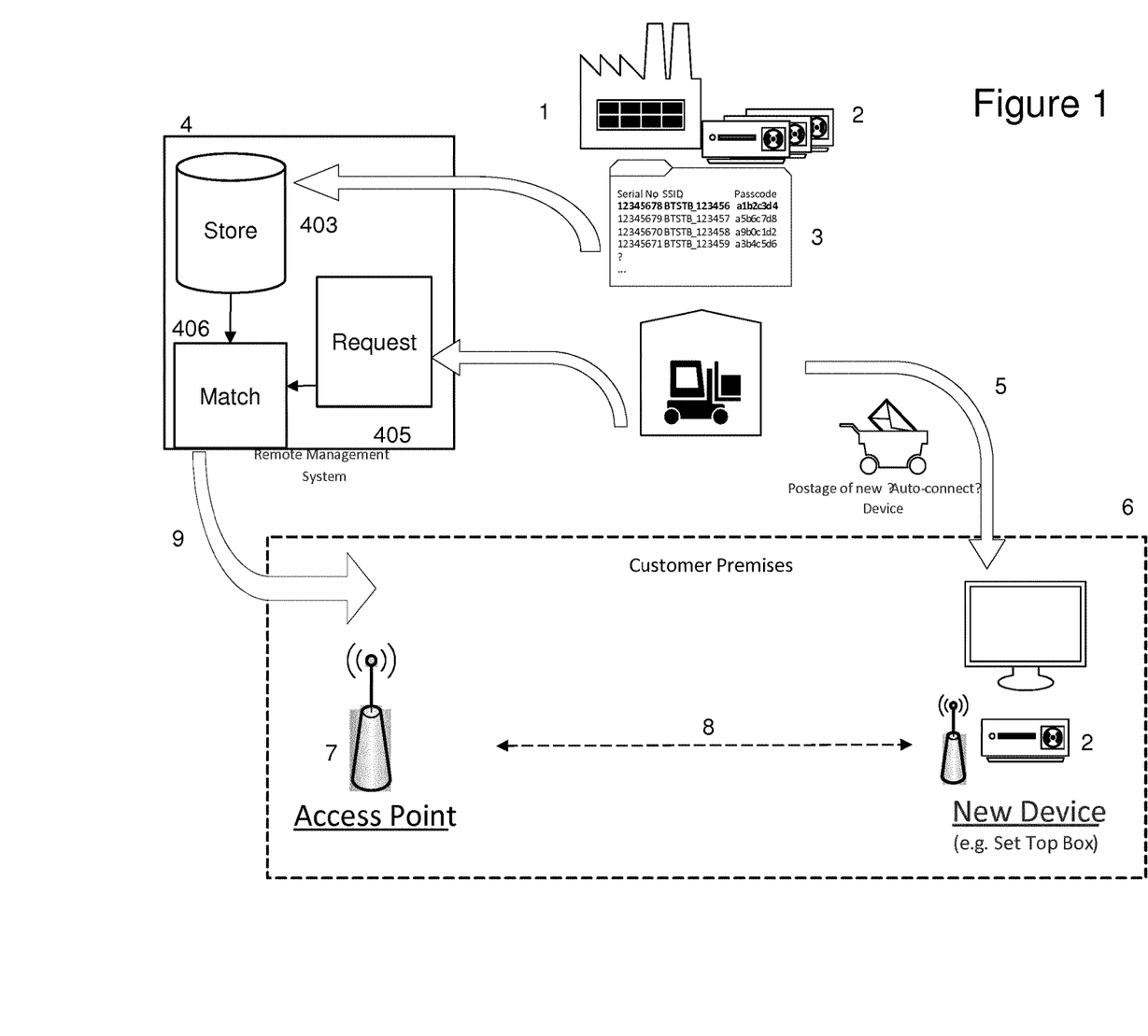
FIG. 1 depicts a general arrangement of the various elements which co-operate to perform embodiments of the invention.

FIG. 1 depicts a manufacturing plant 1 at which new devices 2 are assembled and pre-programmed with "burnt in" identification data. The data is recorded in a look up table 3 which is communicated to the service provider's remote management system 4. The remote management system has a number of functions 403, 405, 406 which will be discussed later with reference to FIG. 2. The device 2 itself is sent over a physical distribution network 5 to a user premises 6 for installation, and for wireless connection 8 to an access point 7. The access point 7 is also capable of connection to a data network 9 such as the Internet.

In the first embodiment, the new device 2 is a device intended to operate in a local access network controlled by the access point 7. In the second embodiment, the new device is intended to operate as an access point, and is to be used to replace the existing access point 7 in operation of the local access network.

Figure 2:
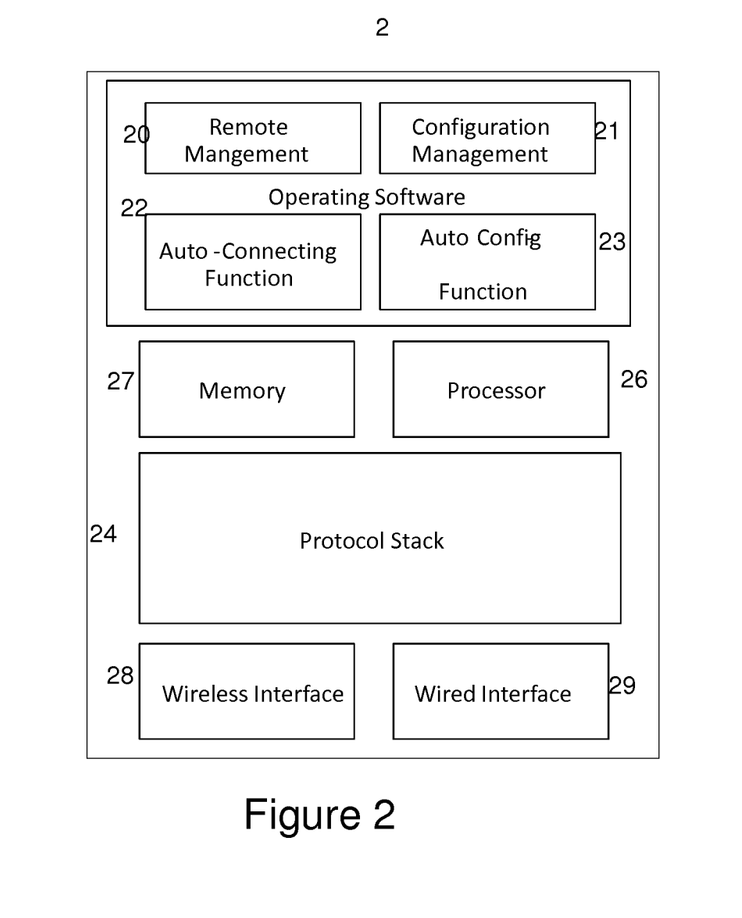
FIG. 2 is a schematic diagram illustrating the general arrangement of a customer equipment configured to operate according to the embodiment of FIG. 1.

FIG. 2 depicts the functional elements of a customer equipment 2 to be delivered to a user and installed in the LAN 8 controlled by the access point 7. It comprises a wireless interface 28 for communicating over a local area network 8. The equipment 2 also has functional elements comprising remote management functions 20, configuration management 21, an autoconnect function 22, and an auto-configuration synchronisation function 23. A protocol stack 24 co-ordinates communications with other terminals over a wireless communications interface 28. It will be noted that in general a wired interface 29 is not required for the operation of the invention, although the device 2 may be equipped with one as depicted.

The device has preconfigured Wi-Fi hotspot credentials (SSID and passcode) built in at the time of manufacture, and is configured to support soft-AP/hotspot mode out of the box by default. This provides a time-limited setup mode in which the device enters a setup mode for a limited period, for example 24 hours after its first boot-up, or until it is manually set up. The set up may be initiated by any suitable indication of delivery to the customer's premises, for example switching on, on connection of the device to an external electrical supply or enabling of a battery.

Figure 3:
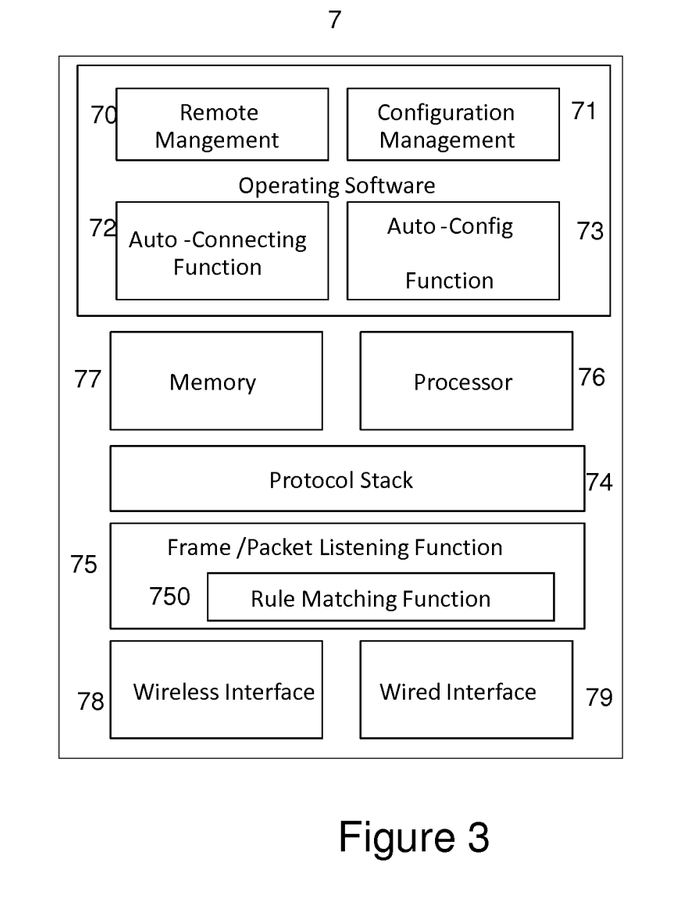
FIG. 3 is a schematic diagram illustrating the general arrangement of an access point arranged for co-operation with the equipment of FIG. 2 according to the embodiment of FIG. 1.

FIG. 3 depicts the functional elements of an access point 7 configured to operate according to this embodiment. Many of the functions are similar to those of the customer equipment 2. It comprises a wired interface 79 for connection to the data network 9, such as the Internet, and a wireless interface 78 for communicating over a local area network 8. The local area network 8 is normally controlled by the access point 7, but the access point is also capable of connection to another local area network as will be discussed.

The access point 7 is under the overall control of a processor 76, and has access to a memory 76 for storing data and programming instructions. The access point 7 also has functional elements similar to those of the consumer device 2, comprising remote management functions 70, configuration management 71, an autoconnect function 72, and an auto-configuration synchronisation function 73. Typical access points have pre-configured Wi-Fi credentials (SSID and Passcode) built in at the time of manufacture. In this embodiment, the access points additionally support a configurable client mode, allowing switching between default access point mode and client mode or, in an alternative embodiment, operation in a hybrid mode supporting both client and access point modes simultaneously. The client mode function is a software defined operating mode, typically used in products such as wifi repeaters or range extenders.

A protocol stack 74 co-ordinates communications with other terminals over the communications interface 78, 79, and a frame/packet listening function 75 is provided for detection of predetermined identification data transmitted or broadcast from other devices, and specifically from the device 2. This function includes a rule-matching function 750. The local area network 8 is normally controlled by the access point 7, but it is also capable of connection to another local area network as will be discussed.

The access point may be manufactured with these capabilities, but many existing access point devices are capable of reconfiguration with new programming data downloaded from a remote management system 4 such that they can be modified whilst in use to have additional capabilities, and it is within the scope of this invention to cover the process of upgrading or reconfiguring such a programmable access point remotely, so as to become capable of operation of the 'auto-connect' process to be discussed below.

Figure 4:
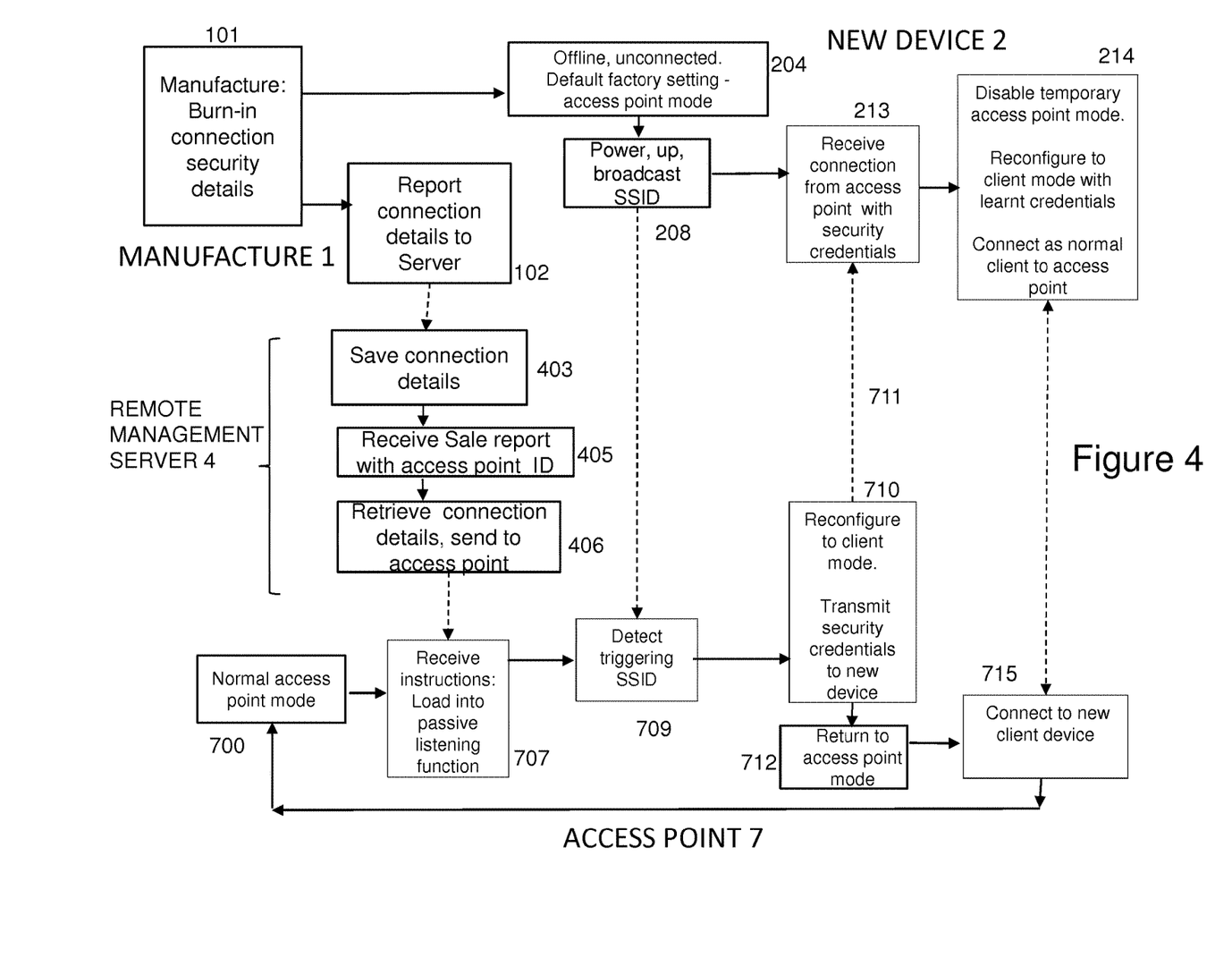
FIG. 4 is a flow diagram depicting the operation of the access point of FIG. 3 and the co-operating device of FIG. 2 in a first process according to the invention.

The process by which the manufacturing process 1, new device 2, the access server 7, and the remote management server 4 co-operate to perform the embodiment of the invention will now be described with reference to FIG. 4. In that Figure, steps performed during manufacture are prefixed with a "1", those performed by the new device 2 are prefixed with a "2", those performed by the remote management system 4 are prefixed with a "4", and those performed by the access point 7 are prefixed with a "7", the last two digits indicating the order in which the steps are performed.

On initial manufacture, each 'auto-connect' device 2 is provided with a "burnt in" SSID identity, passcode and a public serial number (step 101). A concordance 3 between these identities is communicated securely to the remote management server 4 (step 102), where the data is stored (step 403) until required. The manufacturing process (101) configures the auto-connect device 2 with a default setting 204 such that it will enter a default setup mode when it is first powered up, in which it initially acts as a temporary Wi-Fi access-point hotspot. This allows the access-point 7 to recognise the new device 2 when the device is first powered-up within wireless range of the access point 7 through its beacon broadcast advertisements which contain the SSID.

When the new device 2 is allocated to a user, the public serial number is identified, for example by scanning the number on packaging, at the point of sale or on despatch from a warehouse. The remote management server 4 is informed of the public serial number of the device, and of the network identity of the customer to whom it has been allocated. The remote management server can then retrieve the corresponding SSID and passcode (step 405) for the device. This SSID and passcode are then transmitted, together with associated connection instructions, to the access point 7 associated with the customer identity (step 406).

These instructions include three elements. First there are the matching criteria for the listening function 75, such as a beacon frame with the SSID and/or MAC address of the new device 2, Secondly there is a configuration command, for the configuration management system 71, to cause the access point to change to client mode and connect to the SSID using the passcode of the new device. Thirdly, there is an action command to configure the 'auto-connect' function 72 to exchange its own network name (SSID) and passcode with the new device.

It will be noted that no-one handling the device in a shop, warehouse, or in transit, needs to know the SSID of either the new device 2 or the access point 7 to which it is to be connected. Only the public serial number and the network identity of the customer need to be known by such personnel.

The Wi-Fi access point 7 is configured such that when the access point 7 receives an instruction set from the remote management server 4 (step 707) it changes from its normal operational mode 700 to enable a 'listening function' that inspects the layer-2 protocol frames in the signal, to identify a defined 'trigger' event. In the preferred embodiment this 'trigger' event is receipt of a beacon frame (a broadcast Wi-Fi network advertisement) with an SSID (Wi-Fi network name) identified in the instruction set given to it by the remote management system (4). This SSID is the network that will be advertised by the new 'auto-connect' device 2 that is allocated to the user following an order process. It should be noted that once the existing access point 7 has received the instructions/credentials for the new device 2 over the external connection 9, neither device requires an external network connection to complete the remaining process it is only necessary that both are powered up and in wireless communication with each other.

After the listening function is installed (step 707), the access point 7 continues to function as normal, but is additionally listening out for a beacon transmitted by the new device on a predetermined channel specified in the instructions 707 transmitted from the remote management server 4. The access-point may either retune its main traffic channel (on which it communicates with client devices in its vicinity) to correspond in with the channel on which the new device will operate, or it may remain normal operations on its existing channel but implement an off-channel scanning procedure during idle periods, when there is no client traffic, to seek the new device beacon on the channel advised to it. The latter procedure is preferred as it avoids disruption of any channel allocation plan that may be in operation to minimise interference with neighbouring access points. The delay in scanning until an idle period also avoids disruption of any existing sessions the access point may be handling when the new device first comes into range.

A 'match' is detected (i.e. the access point 7 has processed a broadcast beacon frame with an SSID matching the criteria it has been given step 709) when a new device 2 using this identifier is powered-on within range of the access point 7 and starts to transmit its SSID (step 208).

Upon detecting the 'trigger' event the access point 7 reconfigures itself from its default 'access-point' mode to operate instead in a 'client' mode (step 710). During this process any other client devices on the local area network will briefly lose contact with the access node 7, so the access node may defer this step in the process until it detects an absence of activity on the local access network under its control. Alternatively, the access point may support a hybrid mode (concurrent client and access point modes) in order to perform the setup procedure. It may also support multiple radios or frequency bands allowing it to temporarily redirect connected client devices to an alternative radio band whilst the access point operates as a client to the new device 2 during the setup procedure.

Having detected the trigger event and selected a suitable time to continue the process, the access point 7 uses the credentials (SSID and passcode) provided to it in the instruction set from the remote management system to connect, as a client, to the new device 2, which is at this point still in its initial default configuration, and operating as an access point. Having mutually confirmed each other's identities, the original access point 7 can now send the new device 2 its own SSID and passcode (step 711), and then returns to normal operation as an access node (step 712). The new device, on validating the data (step 213), can then use that security data to access the local area network controlled by the original access point 7, (step 214) to allow the new device 2 to operate in client mode as a client of the access point 7 (step 214) such that the new device 2 can connect, in client mode, to the access point 7. The access point 7, which has now returned to operation in normal access-point mode, can therefore accept connection of the new device to the Local access network under its control (step 715).

The process may be over-ridden or interrupted at various points. For example, the new device may have a manual configuration mode which allows it to revert immediately to client mode after initial power up 208. If such a manual intervention takes place, the device 2 ceases to transmit the SSID and the subsequent steps 213, 214 do not take place.

The access point 7 may be arranged to only listen out for the triggering SSID (step 709) for a predetermined timeout period. If the SSID is not detected within that period the access point 7 reverts to normal operation (700) and may subsequently remove the listening rule. Similarly, if the exchange of security details (step 711) fails, the access point 7 resumes normal operation (step 700) without connection of the device 2. These timeouts operate as a failsafe so that the access point 7 continues to operate, and the user continues to have a connection to the data network 4, even if the new device 2 fails to connect.

Figure 5:
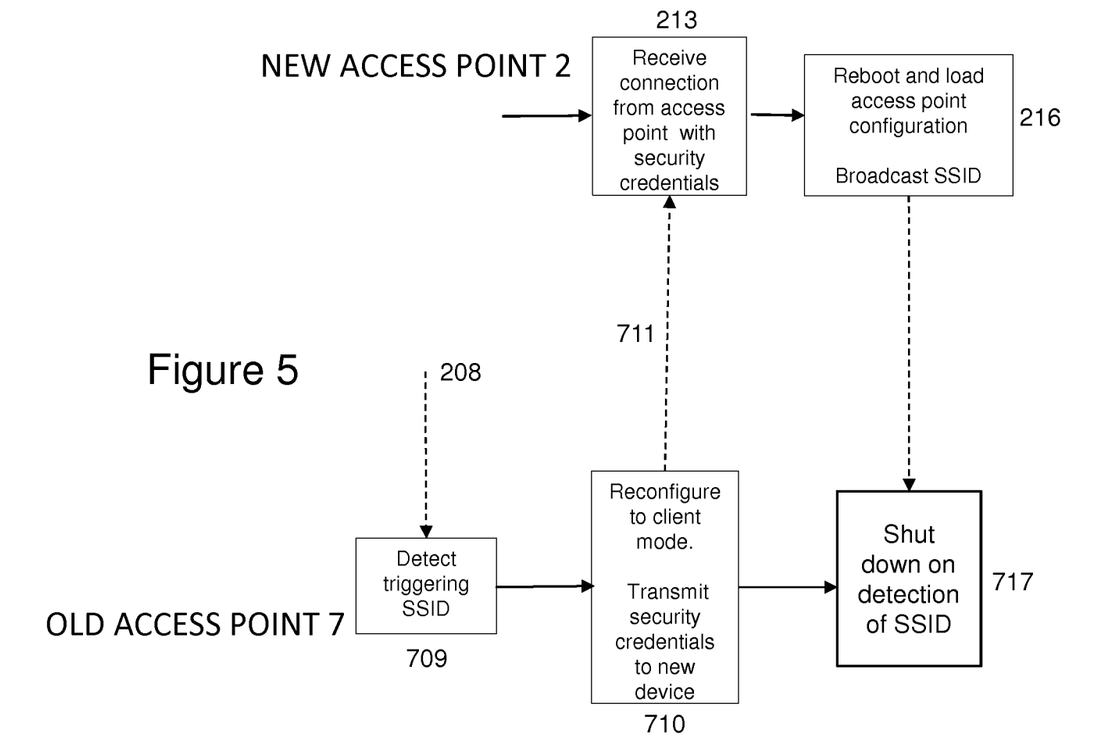
FIG. 5 is a flow diagram depicting the operation of the access point of FIG. 3 and the co-operating device of FIG. 2 in the later stages of a second process according to the invention

In a second embodiment, depicted in FIG. 5, the new device 2 is supplied as a new access point to replace the existing one. In this case the process concludes, after the new device 2 has received the configuration details of the existing access point 2 (step 213), by rebooting and loading those configuration details. After the reboot, the new access point 2 operates in an identical manner to the existing access point 7 (step 216). It may be used as a relay from the original access point (7), which reverts to normal access point mode, or the new access point can be connected to the network 9 and take over operation of the local area network, without any other client devices requiring reconfiguration. In the latter case, the original access point 7, on detection of the beacon signal from the new access point 2, can then be shut down (step 717), or remain in operation as a client node, for example as a relay, as appropriate.

As the present invention is implemented on software within a wireless access point, it may be possible to upgrade a conventional wireless access point to one which can perform a method according to the present invention. Computer code may be deployed to a wireless access point via download, for example via the internet from an ISP, or on some physical media, for example, DVD, CD-ROM, USB memory stick, etc. for which the wireless access point has an appropriate media reader.

The invention claimed is:

1. A wireless network device providing:
   a wireless interface,
   a remote management function to receive, from a remote service provider, authentication information for establishing a secured wireless network connection to a target wireless device initially operating in an access point (AP) mode,
   a configuration management function to configure the wireless network device to operate as a client device in a wireless network through the wireless interface;
   an automatic connection function to connect the wireless network device as a client to the target wireless device based on the authentication information;
   a configuration function to generate an access key for transmission to the target wireless device that allows establishment of a secured wireless network connection controlled by the wireless network device; and
   a recognition function responsive to receipt of the authentication information from the remote service provider by entering a listening mode in which, during operation in an access point mode, it monitors for an identifying beacon broadcast from the target wireless device while the target wireless device is operating in the access point mode, and to activate the configuration management function to switch into a client mode on detection of the identifying beacon, and then to, while the wireless network device is in the client mode, connect the wireless network device to the target wireless device.

2. The wireless network device according to claim 1, in which the configuration management function is arranged to
   transmit client authentication data to the target wireless device
   cause the target wireless device to switch into the client mode in which the target wireless device is to connect as a client with the wireless network device using the said access key
   return the wireless network device to the access point mode; and
   establish a secured wireless network connection over the wireless interface, with the target wireless device operating in the client mode.

3. The wireless network device according to claim 1, in which the configuration function is arranged to
   transmit, to the target wireless device, data relating to the configuration settings of the wireless network device as an access point, such that the target wireless device may be configured to operate in access point mode using the access key and the same configuration details as the wireless network device.

4. A wireless device configured to operate as a target wireless device, providing:
   a wireless interface
   a configuration management function capable of configuring the target wireless device in an access point mode and in a client mode;
   an automatic connection function responsive to authentication data received from a wireless network device initially operating in an access point mode, to establish a secured wireless network connection over the wireless interface, between the target wireless device operating in access point mode and a client mode of the wireless network device,
   a configuration function responsive to an access key received from the wireless network device to reconfigure the target wireless device to operate in a client mode in a secured wireless network connection controlled by the wireless network device;
   wherein the configuration management system is initially configured to operate in a default access point mode in which a broadcast beacon is transmitted by the wireless interface for detection by a wireless network device while the wireless network device is operating in the access point mode; and wherein the target wireless device is configured to connect to the wireless network device while the wireless network device is in the client mode, the wireless network device being switched switch into the client mode on detection of the beacon by the wireless network device.

5. The wireless device according to claim 4, the configuration management function being responsive to an access key received from the wireless network device, by switching to the client mode for co-operation with an access point mode of the wireless network device.

6. The wireless device according to claim 4, the configuration management function being responsive to access key data from the wireless network device, to receive access point configuration data from the wireless network device, and to operate in access point mode, using the same access identity as the wireless network device.

7. The wireless device according to claim 4 configured to operate in access point mode and to generate the broadcast beacon on first power up, until the first to occur of—
detection of the access key
initiation of a manual over-ride procedure
expiry of a time-out period.

8. A method of operating a wireless network device in co-operation with a target wireless device, by
transmitting, from a remote service provider, authentication information for establishing a secured wireless network connection between the wireless network device and the target wireless network device,
operating the wireless network device in a client mode and the target wireless device in an access point mode,
transmitting an access key from the wireless network device to the target wireless network device, the access key providing data for establishing a secured wireless network connection with the wireless network device as access point; wherein,
in response to receiving the authentication information from the remote service provider, the target wireless network device switches to an access point mode and transmits a broadcast beacon,
in response to receiving the authentication information from the remote service provider, the wireless network device enters a listening mode in which, whilst operating in an access point mode, it monitors for the broadcast beacon from the target wireless device while the target wireless device is operating in the access point mode,
on detection of the beacon from the target wireless device, the wireless network device switches into the client mode for connection to the target wireless device for transmission of the access key, and
then, while in the client mode, the wireless network device connects to the target wireless device.

9. The method according to claim 8, in which
in response to transmission of the access key, the wireless network device switches back into access point mode,
in response to reception of the access key, the target wireless device switches into the client mode, and connects as a client with the wireless network device, using client authentication data transmitted by the wireless network device to the target wireless device;

and a secured wireless network connection is established between the wireless access point operating in access point mode and the target wireless device operating in the client mode.

10. The method according to claim 8, in which
the access key transmitted by the wireless network device to the target wireless device includes client authentication data
in response to reception of the access key, the target wireless device is reconfigured to operate in access point mode using the access key and the same access identity as the wireless network device.

11. The method according to claim 8, wherein the target wireless device operates in access point mode, generating broadcast beacons on first power up, until the first to occur of
detection of the access key
initiation of a manual over-ride procedure
expiry of a time-out period.

12. A remote management server for controlling the operation of a wireless access point, comprising
a data store for receiving and storing data recording a concordance between authentication information relating to each of one or more a target wireless devices and a corresponding respective public identity relating to the or each target wireless device
an enquiry function for receiving data matching the public identity of a target wireless device to a specified wireless access point
a retrieval function for retrieving, from the store, the authentication information corresponding to the public identity of the target wireless device and for transmitting the authentication information to the specified wireless access point, together with configuration instructions
wherein the configuration instructions are set to cause the specified wireless access point to:
enter a listening mode in which, whilst operating in an access point mode, it monitors for a broadcast beacon from the target wireless device while the target wireless device is operating in the access point mode,
on detection of the broadcast beacon, to switch into a client mode for connection to the target wireless device, and
then, while the specified wireless access point is in the client mode, connect the specified wireless access point to the target wireless device.

13. A process for remote configuration of a programmable wireless-enabled device to operate according to a wireless access point by transmission of programme data to the wireless-enabled device over a data communications connection, the process comprising:
providing a wireless interface,
performing a remote management step to receive, from a remote service provider, authentication information for establishing a secured wireless network connection to a target wireless device initially operating in an access point (AP) mode,
performing a configuration management step to configure the wireless-enabled device to operate as a client device in a wireless network through the wireless interface;
performing an automatic connection step to connect the wireless-enabled device as a client to the target wireless device based on the authentication information;
performing a configuration step to generate an access key for transmission to the target wireless device that allows establishment of a secured wireless network connection controlled by the wireless network device; and performing a recognition step responsive to receipt of the authentication information from the remote service provider by entering a listening mode in which, during operation in an access point mode, the wireless-enabled device monitors for an identifying beacon broadcast from the target wireless device while the target wireless device is operating in the access point mode, and to activate the configuration management step to switch into a client mode on detection of the identifying beacon, and then to, while the wireless-enabled device is in the client mode, connect the wireless-enabled device to the target wireless device.

14. A computer system including a processor and memory storing computer program code for execution by the processor such that the computer system is configured to at least perform:

a wireless interface function, a remote management function to receive, from a remote service provider, authentication information for establishing a secured wireless network connection to a target wireless device initially operating in an access point (AP) mode, a configuration management function to configure the wireless network device to operate as a client device in a wireless network through the wireless interface;

an automatic connection function to connect the wireless network device as a client to the target wireless device based on the authentication information;

a configuration function to generate an access key for transmission to the target wireless device that allows establishment of a secured wireless network connection controlled by the wireless network device;

a recognition function responsive to receipt of the authentication information from the remote service provider by entering a listening mode in which, during operation in an access point mode, the computer system monitors for an identifying beacon broadcast from the target wireless device while the target wireless device is operating in the access point mode, and to activate the configuration management function to switch into a client mode on detection of the identifying beacon and then to, while the computer system is in the client mode, connect the computer system to the target wireless device.

15. A non-transitory computer-readable medium storing computer program code to, when loaded into a computer system and executed thereon, cause the computer to perform steps of a method of operating a wireless network device in co-operation with a target wireless device, the method comprising:

transmitting, from a remote service provider, authentication information for establishing a secured wireless network connection between the wireless network device and the target wireless network device, operating the wireless network device in a client mode and the target wireless device in an access point mode, transmitting an access key from the wireless network device to the target wireless network device, the access key providing data for establishing a secured wireless network connection with the wireless network device as access point; wherein, in response to receiving the authentication information from the remote service provider, the target wireless network device switches to an access point mode and transmits a broadcast beacon, in response to receiving the authentication information from the remote service provider, the wireless network device enters a listening mode in which, whilst operating in an access point mode, it monitors for the broadcast beacon from the target wireless device while the target wireless device is operating in the access point mode, on detection of the beacon from the target wireless device, the wireless network device switches into the client mode for connection to the target wireless device for transmission of the access key, and then, while in the client mode, the wireless network device connects to the target wireless device.

16. A non-transitory computer-readable medium storing computer program code to, when loaded into a computer system and executed thereon, cause the computer to perform steps of a process for remote configuration of a programmable wireless-enabled device to operate according to a wireless access point by transmission of program data to the wireless-enabled device over a data communications connection, the process comprising:

providing a wireless interface;

performing a remote management step to receive, from a remote service provider, authentication information for establishing a secured wireless network connection to a target wireless device initially operating in an access point (AP) mode;

performing a configuration management step to configure the wireless-enabled device to operate as a client device in a wireless network through the wireless interface;

performing an automatic connection step to connect the wireless-enabled device as a client to the target wireless device based on the authentication information;

performing a configuration step to generate an access key for transmission to the target wireless device that allows establishment of a secured wireless network connection controlled by the wireless network device; and performing a recognition step responsive to receipt of the authentication information from the remote service provider by entering a listening mode in which, during operation in an access point mode, the wireless-enabled device monitors for an identifying beacon broadcast from the target wireless device while the target wireless device is operating in the access point mode, and to activate the configuration management step to switch into a client mode on detection of the identifying beacon, and then to, while the wireless-enabled device is in the client mode, connect the wireless-enabled device to the target wireless device.

* * * * *